June 21, 1938.  R. B. POLK ET AL  2,121,098
APPARATUS FOR SEGMENTING FRUIT
Filed Aug. 2, 1935  3 Sheets-Sheet 1

INVENTORS
Ralph B. Polk and
Ralph Polk Jr.,
BY Hood + Hahn.
ATTORNEYS

INVENTORS
*Ralph B. Polk and
Ralph Polk Jr.,*
BY
*Hood + Hahn.*
ATTORNEYS

Patented June 21, 1938

2,121,098

UNITED STATES PATENT OFFICE 2,121,098

APPARATUS FOR SEGMENTING FRUIT

Ralph B. Polk and Ralph Polk, Jr., Haines City, Fla.

Application August 2, 1935, Serial No. 34,349

14 Claims. (Cl. 146—3)

The object of our invention is to produce an apparatus capable of rapidly and efficiently segregating integument-free, substantially-whole meat segments from fruits of the type wherein the edible portions are nature-formed segmental groups of juice cells, each enclosed in an integument in the form of a segment of an approximate sphere such, for instance, as grapefruit.

The accompanying drawings illustrate an embodiment of our invention:

Fig. 2 is an elevation, on a larger scale, of one of the segregating units;

Fig. 3 is an axial section of the structure shown in Fig. 2;

Figure 1:
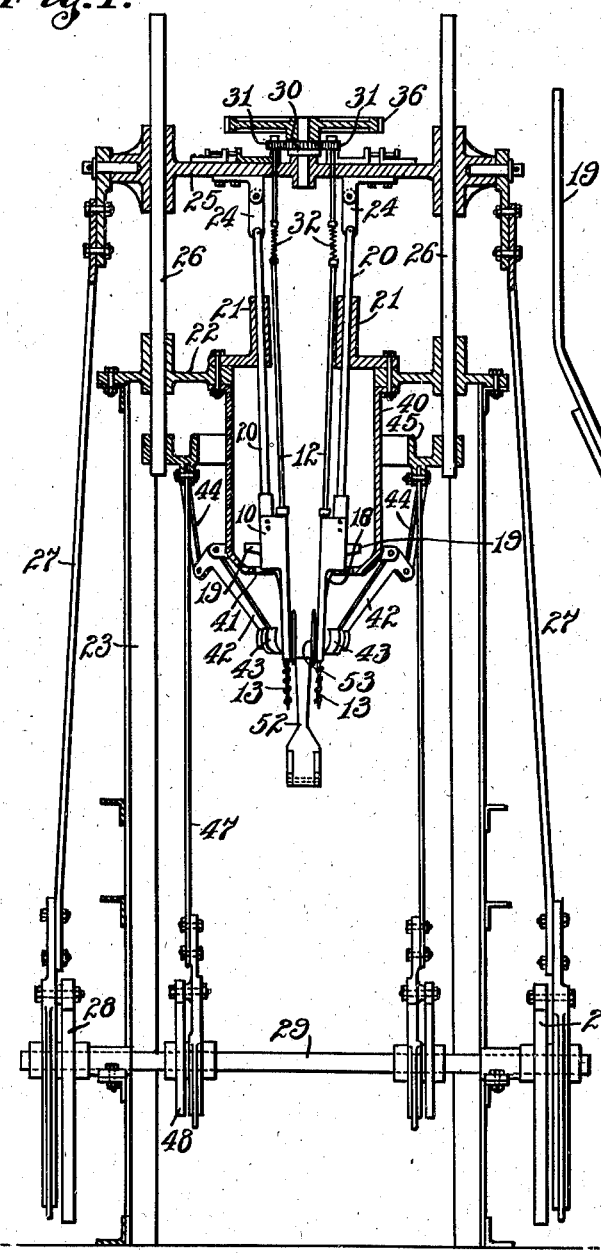
Fig. 1 is a vertical section, diagrammatic in character, of such a machine wherein only two of the groups of segregating units are shown, the remainder having been omitted for the sake of clearness.
Figure 4:
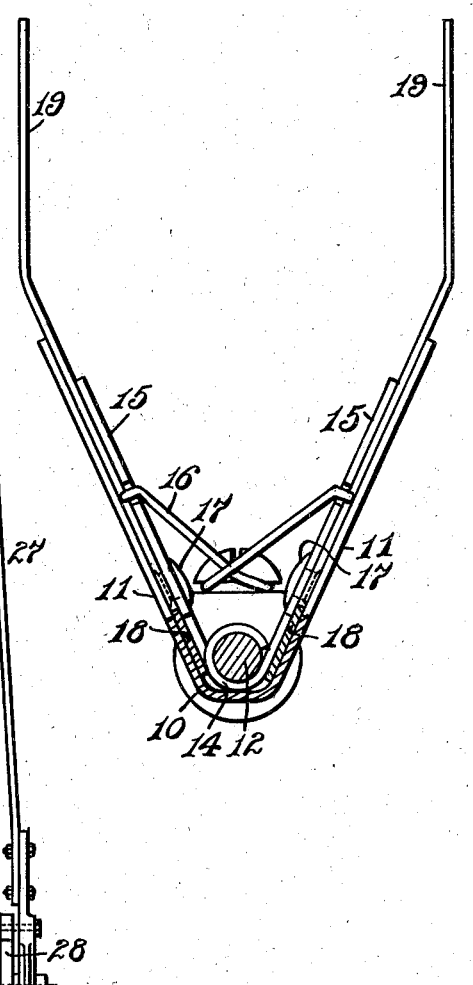
Fig. 4 is a section on line 4—4 of Fig. 2.
Figure 5:
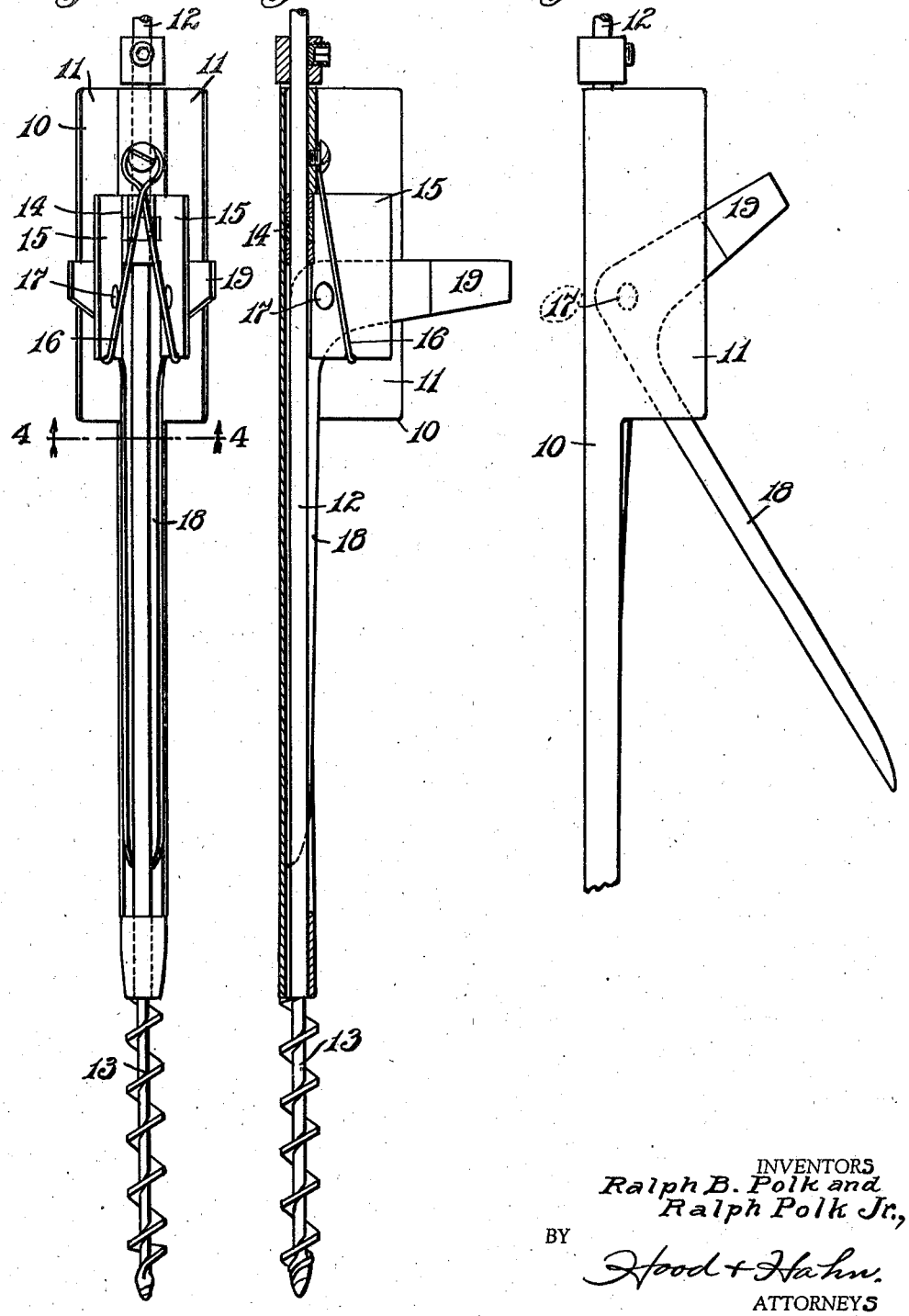
Fig. 5 is an elevation at right angles to the plane of Fig. 2 with the stripper blades in projected position.
Figure 6:
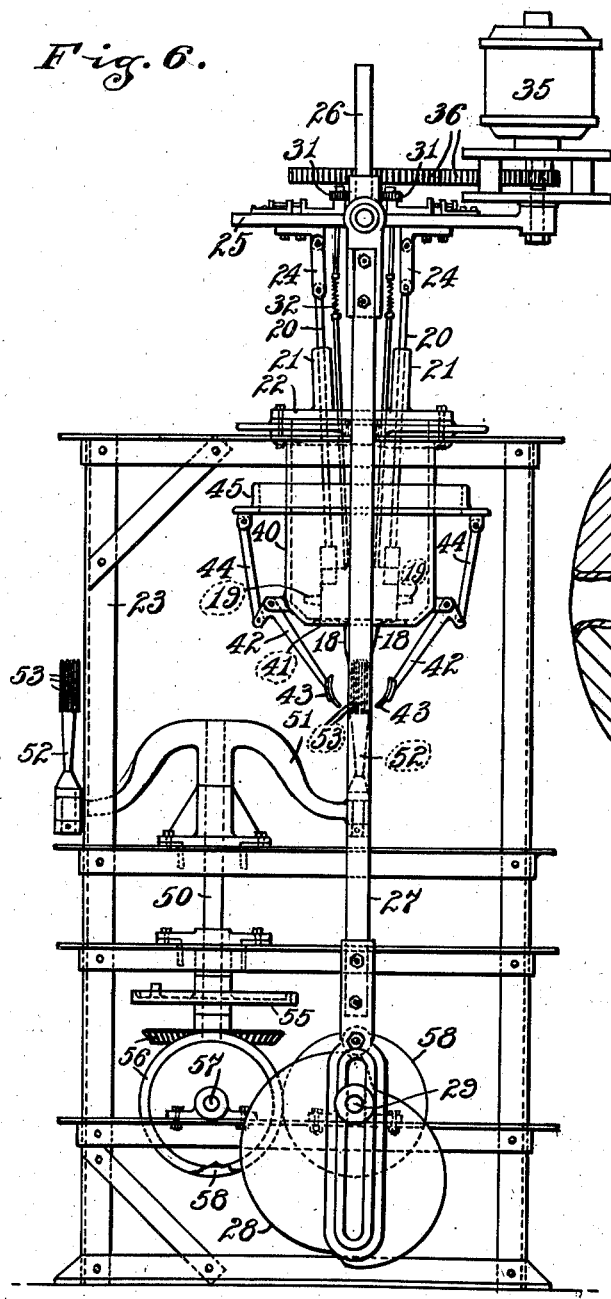
Fig. 6 is an elevation of the structure shown in Fig. 1 in a plane at right angles thereto.

In the drawings, and referring particularly to Figs. 2 to 5, 10 indicates the main body of one of our segregating units which is a finger like structure of V-shaped cross section comprising the flaring walls 11—11. Within the crotch of body 10 is journaled a shaft 12 which, at its lower end carries an auger 13 having a tapered but relatively blunt tip. Hinged at 14 upon the shafts 12 within the upper end of body 10 are stripper blade carriers 15—15 which are yieldingly urged apart about their hinged mounting by a light spring 16.

Pivoted at 17, on each carrier 15 on an axis at right angles to the axis of shaft 11, is an L-shaped stripper blade comprising the comparatively narrow and long stripper portion 18 and the laterally extended manipulating arm 19. The tips of the stripper blades are tapered, as shown, and the outer edges of these blades are relatively dull.

The structure described above will be referred to generally as a segregating unit.

Several of these units, conveniently about ten, are grouped in a circular group about a common axis with the tips of the augers closely adjacent. Each main body 10 is suspended from the lower end of a plunger 20 vertically reciprocable in a bearing 21 carried by a fixed crosshead 22 supported by a suitable frame 23, the several bearings 21 being arranged in a circumferential series and being slightly converged downwardly. Each of the plungers 20 is connected by a link 24 with a vertically reciprocable crosshead 25 slidably mounted upon standards 26 carried by crosshead 22 and the crosshead 25 is vertically reciprocated by any suitable means such, for instance, as pitmans 27—27 actuated by cams 28—28 carried by the main drive-shaft 29.

Journaled centrally upon crosshead 25 is a gear 30 with which are meshed a plurality of pinions 31—31 each of the pinions being connected by a flexible shaft 32 with the shaft 12 of one of the segregating units.

Gear 30 is driven at a comparatively high speed by any suitable means such, for instance, as a motor 35 mounted on cross head 25 and connected by a suitable driving train 36 with 30.

Suspended from crosshead 22 and enclosing the upper ends of the segregating units is a sleeve 40 provided at its lower end with an internal flange 41 projected into the path of movement of the outer ends of the actuating portions 16 of the stripper blades 15.

Pivoted on the sleeve 40 near its lower end are several bell crank levers 42—42, arranged in a circumferential series and each provided at its lower end with a cup segment 43 capable of engaging and enclosing a fruit to be operated upon. The cup segments 43 are conveniently lined with a relatively soft lining such, for instance, as sponge rubber. Each of the levers 42 is connected by a link 44 with a vertically reciprocable annular crosshead 45 slidably mounted upon the lower ends of standards 26 and supported by pitmans 47—47 actuated by cams 48—48 on shaft 29.

Journaled in frame 23 on the vertical shaft 50 is a fork table 51 carrying a plurality of upwardly presented forks 52—52 arranged in a circumferential series, each of the forks comprising a circumferential series of laterally spaced comparatively slender tines 53, each of which is tapered at its tip. The tines 53 are arranged in a circumferential series having a diameter slightly greater than the diametrical distance of the apices of the segmental integuments I of the fruit to be operated upon, the arrangement being such that, when such a fruit is impaled upon the fork in the direction of its polar axis, the tines will penetrate the meat segments just within the crotches of said integuments between said integuments and the seeds, if seeds be present.

The fork table 51 is intermittently advanced, step by step, through an angle equal to the circumferential spacing of the forks by any suitable means such, for instance, as a Swiss gear train 55 connected by a suitable gearing 56 with a shaft 57 connected by gears 58—58 with shaft 29.

Figure 7:
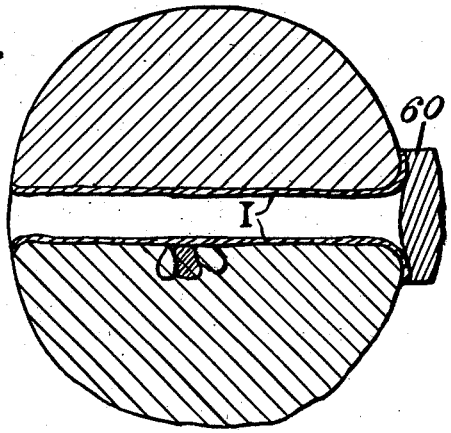
Fig. 7 is a polar section of a grapefruit prepared in a preferred manner for manipulation in our device.

The operation is as follows:

The fruit is denuded of a major portion of its skin, together with the subjacent circumferential portions of the integuments which enclose the meat segments. We prefer, however, to leave undisturbed, at the stem end of the fruit, a button of skin and subjacent integuments, as indicated at 60 in Fig. 7, the diameter of said button being such that it slightly overlies the apices of the subjacent fruit segments, with the natural bond between the skin and subjacent integuments undisturbed.

A peeled fruit having been impaled polarwise upon one of the forks 52 and brought into vertical alignment with the axis of the group of segregating elements, cross-head 25 is lowered to bring the tines of the several augers 13 into engagement with the fruit. The tips of these augers being tapered and relatively dull and the structure and mounting of the segregating units permitting a small amount of lateral deflection, the augers will enter the upper ends of the fruit segments between the radial portions of their enclosing integuments and as the crosshead 25 proceeds downwardly (preferably at a relatively slow speed) the juice cells in the apices of the fruit segments will be broken down and the subjacent compact groups of seeds, if seeds be present, will be disturbed, some of the seeds being moved upwardly by the auger and discharged from the upper end of the fruit, while other seeds will be driven downwardly and discharged from the lower end of the fruit.

Thereupon head 25 is continued downwardly, preferably at a higher speed, to project the stripper blades through the fruit, in the spaces which have been voided by the augers, ultimately fully projecting the stripper blades through the fruit, by which time arms 19 of the stripper blades have come into contact with flange 41 of sleeve 40. Thereupon the cup segments 43 are retracted from the fruit, by an upward movement of the annular crosshead 45, and the stripper blades are swung outwardly upon their pivots by a further descent of crosshead 25.

The edges of the stripper blades being relatively dull and the stripper blades being yieldingly urged apart, and the included angles of the meat segments being variable, it will be noted that, as the stripper blades are swung radially outwardly relative to the fruit, said blades will move outwardly in the cohesion planes of the meat segments and radial integuments, so that each pair of stripper blades adjust themselves to the angular extent of the particular meat segment into which they happen to have projected, and, as the stripper blades finally emerge from the fruit radially, the integument-free, substantially whole, meat segments will be ejected to drop upon a suitable gathering table, not shown.

There is a relatively strong natural cohesion bonding the integuments in a circumferential group, and the tines of the fork lie within the crotches of these integuments thereby providing additional resistance to hold the integuments as the stripper blades are forced outwardly to separate the integuments and enclosed meat segments, and the button of undisturbed skin at the stem end contributes materially to restrain the integuments against rupture of the natural cohesion.

In grapefruit the meat segments vary in number from ten to fifteen and consequently vary as to included angles. In practice, there are rarely more than ten segments of sufficient angular extent to be worthwhile for individualization and consequently, we recommend a group of segregating units about ten in number. The denuded carcasses of fruit which may contain undisturbed juice cells may be passed through a squeezer in order to save the juice from that source.

As indicated in the drawings, the stripper blade 18 is thin, laterally flexible, and quite narrow and has a length somewhat exceeding the diameter of the fruit through which the blade is to be projected polarwise of a juice cell segment. The carrier 15, upon which this blade is pivoted at 17, is hinged upon the shaft 12 and consequently lies tangentially of that shaft so as to swing about the shaft and, in all positions of its swinging movement, lies tangentially of the shaft and consequently the blade 18, partaking of the swinging movement of the carrier 15, lies in planes which will be tangential to the shaft. When such an implement is projected through a peeled fruit between radial components of the integument of the juice cell group at the apex of the radial integument components without rupturing the apex of the integument, the central rod will adjust itself between the radial integuments so that the swinging blade 18 will automatically adjust itself to lie in a plane which will be parallel to the plane of bond between the radial integuments and the juice cell group, or substantially in that plane, so that, when the blade 18 is swung outwardly its natural movement will be in the aforesaid bonding plane and thereby break the natural bond between the integument and the juice cell group without tearing the radial integument from its root at the vertex of the integument and without damaging the juice cell group, the narrowness of the blade, its flexibility and thinness contributing to this result.

We claim as our invention:

1. Means for segregating fruit segments, comprising a pair of divergent blade carriers hinged each with relation to the other for independent swinging movement about a common axis, a spring yieldingly diverging said carriers, and a pair of stripper blades, one pivoted on each carrier on an axis at right angles to the hinge axis.

2. Means for segregating fruit segments, comprising a rotary auger, a pair of finger-like stripper blades flanking the auger axis upon opposite sides and hinged about an axis parallel with the auger axis and each movable as to its stripping portion outwardly from the hinge axis.

3. Means for segregating fruit segments, comprising a rotary auger, a pair of stripper blade carriers hinged on an axis parallel with the auger axis, a spring urging the free edges of said carriers apart, and two finger-like stripper blades, one mounted on each carrier for movement therewith, and also for lateral movement toward and from the hinge axis.

4. Means for segregating fruit segments, comprising a rotary auger, a pair of stripper blade carriers hinged on an axis parallel with the auger axis, a spring urging the free edges of said carriers apart, and two finger-like stripper blades one pivoted at its root on each carrier on an axis at right angles to the hinge axis.

5. In a device for segregating fruit segments, means for supporting a fruit polarwise, a circular group of segmenting units each comprising a fruit-penetrating tip and a pair of independently hinged stripper blades all proportioned to enter the fruit parallel with the fruit axis between radial components of a segment integument at the apex of the segment, said group of units being arranged about an axis substantially alignable polarwise with the fruit and each supported to permit its tip to be laterally displaceable, and means for causing fruit penetration by said segmenting elements, each within an unruptured vertex of a segment integument.

6. In a device for segregating fruit segments, means for supporting a fruit polarwise, a circular group of segmenting units arranged about an axis substantially alignable polarwise with the fruit, each of said units comprising a rotary auger, two divergent stripper blades flanking the auger axis upon opposite sides and each hinged with relation to the other for independent movement about an axis parallel with the auger axis, and a spring urging apart the active edges of said blades, together with means for causing fruit penetration by said augers and stripper blades.

7. In a device for segregating fruit segments, means for supporting a fruit polarwise, a circular group of segmenting units arranged about an axis substantially alignable polarwise with the fruit, each of said units comprising a rotary auger, two divergent stripper-blade carriers relatively hinged about an axis parallel with the auger axis, a spring yieldingly diverging said carriers, and two finger-like stripper blades one pivoted at its root upon each carrier on an axis at right angles to the hinge axis, together with means for causing fruit penetrated by said auger and stripper blades, and means for swinging said blades about their pivots away from the hinge axis after fruit penetration.

8. A device for segregating meat sections of citrus fruit and similar fruits, comprising an auger projectible polarwise through the fruit between the flaring apex portions of the segment integument, and divergent stripper blades associated with said auger at its base to partake of the axial movement of the auger, said stripper blades flanking the auger axis upon opposite sides divergent less than 45 degrees and insertable between the radial portions of the integument of the particular fruit segment penetrated by the auger.

9. A device of the character specified in the immediately preceding claim wherein the stripper blades are radially movable in divergent planes relative to the auger axis.

10. Means for segregating fruit segments from adherent radial integuments, comprising a finger-like body projectible parallel with the axis of a fruit between the radial portions at the apex, two blade carriers independently hinged on said body, and a finger-like stripper blade pivoted on each carrier on an axis transverse to the hinge axis.

11. In a device for segregating fruit segments, the combination of, means for supporting a naturally-segmented fruit polarwise, a stripper blade carrier, a stripper blade projectible into the fruit parallel with the polar axis and between flaring radial portions of a segment integument, and pivoted upon an axis transverse to the polar axis of the fruit, means for relatively moving the fruit and the blade carrier with its blade to cause blade-penetration of the fruit between radial components of a segment integument, and means to swing said stripper blade upon its pivot after fruit penetration has been accomplished.

12. In a device for segregating fruit segments, the combination of, means for supporting a naturally-segmented fruit polarwise, a finger projectible into the fruit parallel with its polar axis between divergent portions of a segment integument at the apex, a pair of divergent stripper blade carriers independently hinged on said finger for variable divergence, a stripper blade pivoted on each carrier on an axis transverse to the hinge axis, means for relatively moving said fruit and the finger with its blades to blade-penetrate the fruit in the apex of a segment integument between the radial components thereof, and means to swing said stripper blades upon their respective pivots after fruit penetration has been accomplished.

13. An implement for rupturing the natural bond between a radial segment-integument and the substantially-whole adherent juice-cell-group of a peeled citrus fruit, comprising a slender rod, the diameter of which is small enough to permit projection thereof polarwise of and through a fruit-segment within the apex of the segment-integument between the radial portions of said integument without rupture of the apex of the integument and a swinging stripper blade pivotally associated with said rod on an axis transverse to the length of the rod and so arranged that said blade may be swung in a plane which is substantially tangential to said rod, said blade being laterally flexible, thin and narrow and of a length substantially exceeding the polarwise dimension of a fruit segment, and means by which said blade may be swung to and from parallelism with said rod.

14. An implement for rupturing the natural bond between a radial segment-integument and the substantially-whole juice-cell-group of a peeled citrus fruit, comprising a slender rod, the diameter of which is small enough to permit projection thereof polarwise of and through a fruit-segment within the apex of the segment-integument between the radial portions of said integument without rupture of the apex of the integument, a blade-carrier pivoted on said rod on an axis parallel with the length of the rod, a swinging stripper blade pivotally mounted on said carrier on an axis transverse to the length of the rod and so arranged that said blade may be swung in a plane which is substantially tangential to said rod, and means by which said blade may be swung to and from parallelism with said rod.

RALPH B. POLK.
RALPH POLK, Jr.